United States Patent
Eger et al.

(10) Patent No.: US 7,201,933 B2
(45) Date of Patent: Apr. 10, 2007

(54) LAMELLAR LIQUID CRYSTALS IN VISCOUS OIL PRODUCT

(75) Inventors: Saul Eger, Yokneam Moshava (IL); Menachem Erlich, Rehovot (IL); Itzhak Neeman, Haifa (IL)

(73) Assignee: Dr. Eger-Olive Oil Products Industry Ltd., Yokneam, Moshava (IL)

( * ) Notice: Subject to any disclaimer, the term of this patent is extended or adjusted under 35 U.S.C. 154(b) by 502 days.

(21) Appl. No.: 10/483,124

(22) PCT Filed: Jul. 9, 2002

(86) PCT No.: PCT/IL02/00557

§ 371 (c)(1), (2), (4) Date: Jan. 8, 2004

(87) PCT Pub. No.: WO03/005831

PCT Pub. Date: Jan. 23, 2003

(65) Prior Publication Data

US 2004/0137121 A1    Jul. 15, 2004

(51) Int. Cl.
    A23D 5/00    (2006.01)
(52) U.S. Cl. .................. 426/601; 426/607; 426/610
(58) Field of Classification Search ..................... None
    See application file for complete search history.

(56) References Cited

U.S. PATENT DOCUMENTS 4,940,601 A * 7/1990 Orphanos et al. ........... 426/601
6,117,476 A * 9/2000 Eger et al. .................. 426/601
6,156,369 A * 12/2000 Eger et al. .................. 426/601

OTHER PUBLICATIONS

Harman, D. "Free radical theory of Aging: Effect of fat on lipid composition and function of the brain" in *3rd International Congress On the biological value of olive oil*. Canin,Creta. 1980, p. 190.

Berry, M.E. et al. "Effects of diets rich in monounsaturated fatty acids on plasma lipoproteins—The Jerusalem Study. II Monounsaturated fatty acids vs. Carbohydrates" *Am. J. Clin. Nat.* 1992, 56, pp. 394-403.

Pinckney, E.R.; et al. "The potential toxicity of excessive polyunsaturates. Do not let the patient harm himself" *Am. Heart J.,* 1973, 85, p. 723.

Trichopoula, A. et al. "Consumption of olive oil and specific food groups in relation to breast cancer risk" *Greece. J. of the National Cancer Institute*, 1995, 87(2).

Bitterman, W.A. et al. "Environmental and nutritional factors significantly associated with cancer of the urinary tract among different ethnic groups" *Urologic. Clinics of North America* 1991, 18(3).

(Continued)

*Primary Examiner*—Layla G. Lauchman
*Assistant Examiner*—Juan D. Valentin, II
(74) *Attorney, Agent, or Firm*—Mark M. Friedman

(57) ABSTRACT

Disclosed is a viscous oil product made by combining an oil or oil-containing product with a crystallizing agent, moderately heating the mixture and allowing the mixture to cool, forming lamellar liquid crystals. A crystal stabilizing agent is also disclosed. A uniquely healthy and palatable manner of providing essential fatty acids for consumption is disclosed.

27 Claims, 4 Drawing Sheets

OTHER PUBLICATIONS

Laval-Jeanet, A.M. et al. "Effets des lipides oleiques sur la croissance et la composition de l'os en nutrition experimentale" in the *3rd International Congress on the biological value of olive oil. Concea,Crete*, 1980, p. 309.

Crawford, M.A. "The role of essential fats in human maternal and infant nutrition with special reference to brain growth" in the 2nd International Congress on the biology value of olive oil. Toremolinos 1975, p. 35.

* cited by examiner

LAMELLAR LIQUID CRYSTALS IN VISCOUS OIL PRODUCT

FIELD OF THE INVENTION

The present invention is directed to the field of oils and more particularly to a general method of rendering oil-containing products viscous by producing lamellar liquid crystals in the oil. In particular, it concerns a viscous oil product containing oil, a crystallizing agent and optionally a crystal-stabilizing agent or an essential fatty acid.

BACKGROUND OF THE INVENTION

Fats and oils are an important source of energy, have an important role as carriers of fat-soluble vitamins and have indispensable functional properties in improving the quality of food products with respect to such properties as texture, flavor and structure.

The therapeutic properties of some oils, such as olive oil and fish oil have been widely documented. Olive oil has been indicated as having a therapeutic effect in stomach ailments (1, 1a), increasing memory (2), decreasing mortality from heart disease due to increasing blood flow (3) and softening skin (4). Additionally, olive oil is used in relieving ear infection, may reduce the risk of certain cancers (5, 6), decreases calcium loss from bones and increases mineral absorption (7). In children, olive oil and fish oil has been linked to stimulating growth and development (8). Other oils recognized as being "healthy" include avocado oil, walnut oil and macadamia oil.

Food spreads such as margarine and butter are a preferred manner of consuming oil products in the Western world. Food spreads are used in the home and in industry for cooking, baking, and in the preparation of sandwiches and numerous other food products. In recent years, attention has been directed to producing healthier food spreads in the form of reduced fat alternatives to the existing products.

Margarines are generally water/oil emulsions. The taste of margarine and related food spreads is due mostly to water-soluble flavors, oil-soluble flavors and salt. Margarine type products contain at least 80% of fat by weight. The fat content is made up mainly of hydrogenated and partially hydrogenated fats and oils. As is known to one skilled in the art hydrogenated and partially hydrogenated fats and oils (suspected carcinogens) as well as trans isomer fatty acids (suspected as contributing to athersclerosis formation) are not considered particularly healthy for human consumption.

U.S. Pat. No. 4,226,895, U.S. Pat. No. 4,284,655 and U.S. Pat. No. 5,409,727 teach of food spreads that are all substantially an oil in water emulsions. U.S. Pat. No. 5,360,626 teaches a food spread containing an aqueous phase and an oil phase.

U.S. Pat. No. 5,360,626 discloses an edible food product containing an oil or fat thickened with a hardening agent comprising an alkyl-substituted, non-nitrogen containing oil-soluble polymer having a molecular weight of at least 2000 Dalton.

U.S. Pat. No. 5,376,398 teaches a fat substitute useful for preparing a reduced calorie food product, the fat substitute comprising an edible triglyceride and a polytetramethylene ether glycol esterified with a fatty acid entity. Additionally, U.S. Pat. No. 5,376,398 teaches a food product where the fat component thereof is a polyteramethylene ether glycol esterified with a fatty acid entity.

U.S. Pat. No. 6,117,476 and U.S. Pat. No. 6,156,369 teach edible oil-based food spreads that overcome the problems discussed above. In U.S. Pat. No. 6,117,476 a waterless mixture composed of 90% to 98% oil and 2% to 10% monoglyceride gives a smearable product at normal eating temperature. In U.S. Pat. No. 6,156,369 a waterless mixture composed of 85% to 98% oil, 2% to 15% monoglyceride and in some cases up to 0.05% emulsifier such as Tween® is disclosed. In both U.S. Pat. No. 6,117,476 and U.S. Pat. No. 6,156,369 different edible oils are used but olive oil and fish oil are preferred. In both U.S. Pat. No. 6,117,476 and U.S. Pat. No. 6,156,369 any monoglyceride is used, but oleic or palmitic acid derivatives are preferred. In both case a process of manufacture is disclosed where an oil/monoglyceride mixture is heated to no more than 75° C.

It would be highly advantageous to have a viscous to solid oil product with a pleasing texture that can be made with no harmful additives and can be produced without heating to a degree which may cause the oil to become unhealthy.

Herein, the term "fat" and the term "oil" shall be used interchangeably to refer collectively to fats and oils.

REFERENCES

1. Taits, N. S. "Use of olive oil in the treatment of ulcer patients" in *Urach. Delo.* 1966, 7, 67.

1a. Ricci, G. "L'olio di oliva in gastroenterologia" in *1st International Congress on the biological value of olive oil, Lacca* (Italy) 10–12 Oct. 1969, p.128.

2. Harman, D. "Free radical theory of Aging: Effect of fat on lipid composition and function of the brain" in *3rd International Congress On the biological value of olive oil. Canin, Creta.* 1980, p. 190.

3. Berry M. E. et al. "Effects of diets rich in monounsaturated fatty acids on plasma lipoproteins-The Jerusalem Study. II Monounsaturated fatty acids vs. Carbohydrates" *Am. J. Clin. Nat.* 1992, 56, pp.394–403.

4. Pinckney, E. R.; et al. "The potential toxicity of excessive polyunsaturates. Do not let the patient harm himself" *Am. Heart J.,* 1973, 85, p.723.

5. Trichopoula, A. et al. "Consumption of olive oil and specific food groups in relation to breast cancer risk" Greece. *J. of the National Cancer Institute,* 1995, 87(2).

6. Bitterman. W. A. et al. "Environmental and nutritional factors significantly associated with cancer of the urinary tract among different ethnic groups" *Urologic. Clinics of North America* 1991, 18(3).

7. Laval-Jeanet, A. M. et al. "Effets des lipides oleiques sur la croissance et la composition de l'os en nutrition experimentale" in the 3*rd International Congress on the biological value of olive oil. Conea, Crete,* 1980, p.309.

8. Crawford, M. A. "The role of essential fats in human maternal and infant nutrition with special reference to brain growth" in the 2*nd International Congress on the biology value of olive oil. Toremolinos* 1975, p.35.

SUMMARY OF THE INVENTION

The present invention is of a viscous oil product made of oil and a crystallizing agent, together forming lamellar liquid crystals and a method to make the same. By viscous oil product is meant, for example, thickened liquid oils, homogenized oil-containing pastes as well as solid to semi-solid oil spreads (i.e. margarine-like products). According to a feature of the present invention the ratio of oil to crystallizing agent is dependent on the desired degree of product solidity desired. The ratio of oil to crystallizing agent is preferably from about 9 to 1 to about 49 to 1 and more preferably from about 12 to 1 to about 24 to 1.

According to a feature of the present invention by "oil" is meant a liquid oil or fat (e.g. oils from olives, avocado, rapeseed, soybean, sunflower, peanut, safflower, cottonseed, coconut, rice bran, mustardseed, camelina, chia, fish, flaxseed, perilla, palm, sesame, peanut, almond, pine nut, macadamia, borage, primrose and corn as well as mixtures of different fats and oils and mixtures of palm oil with palm stearin or palm kernel stearin). According to a further feature of the present invention the term "oil" also includes oily products, especially oily plant products having at least about 15% oil by weight, more preferably above about 20%, even more preferably above about 30% and most preferably above about 40%. By oily plant products is meant pastes such as tahini (sesame paste) and oil containing plant-parts such as sesame seeds, peanuts, almonds, walnuts, pine nuts and macadamia nuts. Also included are mixtures of different oils and oily products.

According to a feature of the present invention suitable crystallizing agents include monoglycerides, as described in U.S. Pat. No. 6,117,476 and U.S. Pat. No. 6,156,369. Additional crystallizing agents, divided into eight families, include:

a) phospholipids, especially lechitins. Lechitins are especially preferred as the phosphatidyl serine or phosphatidyl choline forms of lechitin are considered to be important for brain functioning;

b) glycerol esters of fatty acids. Amongst this family of crystallizing agents are two categories: 1) monoacylglycerol esters (glycerol mono fatty acids, monoglyceride esters) and 2) diacylglycerol esters of fatty acids (glycerol di fatty acid esters, di glyceride esters). Also included amongst the second family of crystallizing agents are mixtures of categories 1 and 2, the mixtures known as monodiglycerides. The fatty acid part of a member of this family of crystallizing agents come from different sources, e.g. palm, soybeans, rapeseed, sunflower fish and tallow. Included are saturated and unsaturated fatty acids such as stearic, palmitic, lauric, oleic, linoleic, linolenic, behenic and archidic fatty acids;

c) polyglycerol esters of fatty acids. The polyglycerol esters have from one to ten fatty acids attached to a polyglycerol backbone. Included, for example, are decaglycerol decastearate (10.G.10.S.), diglycerol monostearate (2.G.1.S.), diglycerol monopalmitate (2.G.1.P.), triglycerol monostearate (3.G.1.S.), triglycerol monopalmitate (3.G.1.P.), hexaglycerol monostearate (6.G.1.S.), hexaglycerol tristearate (6.G.3.S.), decaglycerol octostearate (10.G.8.S.) and decaglycerol octopalmitate (10.G.8P.);

d) propylene glycolesters (propylene glycol monofatty acid esters, propylene glycol difatty acid esters) including propylene glycol mono stearate (PGMS) and propylene glycol stearate (DPGMS);

e) sugar esters of fatty acids, especially saturated fatty acids, including complex mixtures of sucrose mono and di fatty acid esters of various fatty acid chain length including, for example, sucrose mono stearate, sucrose monopalmitate, sucrose monolaurate and sucrose monooleate;

f) sodium or potassium stearoyl lactylates;

g) polyglycerol poly ricinoleate (PGPR).

According to a feature of the present invention included are individual crystallizing agents as well as mixtures of crystallizing agents, including mixtures of crystallizing agents taken from one or more families.

As is discussed hereinbelow, the crystallizing agents are used for the production of lamellar liquid crystals in oil, consequently increasing the viscosity of the oil. Said otherwise, the method of the present invention includes the making of a viscous oil-containing product by dissolving a crystallizing agent in an oil-containing substrate and thus forming lamellar liquid crystals in the oil-containing substrate.

The present invention is also of a viscous oil product containing a mixture of oil, a crystallizing agent and a crystal stabilizing agent together forming lamellar liquid crystals and a method to make the same. According to a feature of the present invention, when used the weight of crystal stabilizing agent added is preferably from about 0.001% to about 5% and more preferably from about 0.1% to about 2% of the weight of the oil in the product. According to a feature of the present invention the crystal stabilizing agent added is a powdered fat fraction with a melting point less than about 80° C. such as Akofine PO5®, Akofine R® or Cessa Powder 60®. Details of crystal stabilizing agents according to the present invention are described in "Food and Marketing Technology" April 2002 pp. 44–45, which is incorporated by reference for all purposes as if fully set forth herein. Other suitable crystal stabilizing agents include Akofine K25®, Akofine SP01®, Akofine D08® and Akofine WOO®.

According to a further feature of the present invention, oil/fat-soluble flavorings or oil/fat-soluble vitamins are added as additional components of a viscous oil product of the present invention.

According to a further feature of the present invention, one or more essential fatty acids (EFAs) are added as a component of the viscous oil product of the present invention. Preferred EFAs include DHA (docosahexaenoic acid) and EPA (eicosapentaenoic acid) from any source, most preferably as components of fish oil; ALA (alpha linolenic acid) from any source, preferably of non-animal origin, most preferably as a component of flax, camelina or safflower oil; GLA (gamma linolenic acid) from any source, most preferably as a component of borage seed or primrose oil; CLA (conjugated linolenic acid), pure or as mixtures, especially 8-cis, 10-trans linolenic acid from any source.

The preparation of the viscous oil product of the present invention involves three main steps: combining the oil and crystallizing agent to make a mixture, heating and mixing the mixture until homogenous, and then cooling the mixture to form the viscous oil product of the present invention.

At room temperature crystallizing agents are generally not soluble in oils. According to a feature of the present invention, the crystallizing agents are preferably dissolved in the oil at temperatures of from preferably 45° C. to about 120° C., more preferably from about 45° C. to about 90° C., and even more preferably from about 45° C. to about 75° C. At these temperatures, the crystallizing agents dissolve and the mixture is substantially transparent.

According to a feature of the present invention, during the cooling process properties of the product are improved by reducing the size of the lamellar liquid crystals. A preferred way to reduce the size of the crystals is through homogenization of the mixture. Homogenization can be performed using the methods known in the art, for example, high-shear homogenization or piston homogenization.

According to a feature of the present invention, a crystal stabilizing agent is added. The temperature of the mixture must be high enough so that complete dissolution of the crystal stabilizing agent is achieved. Clearly, a mixture containing crystal stabilizing agent can also be homogenized in order to reduce crystal size.

According to a feature of the present invention, when oxygen sensitive substances are added to a product of the present invention (for example EFAs), the production process is performed in an inert atmosphere, specifically by de aerating the oil or the mixture at any appropriate moment during the process (for example, by bubbling an inert gas such as nitrogen through the mixture) and maintaining the product in an inert atmosphere until the product solidifies.

According to the teachings of the present invention, when a product is made based on the use of an oily product, such as an oily product of plant origin, the oily product is supplied in any convenient form such as a paste or solid. By solid is included the whole plant part such as whole nuts, grains and seeds (after having been properly prepared, i.e. cleaned, shelled and the such) or fragments thereof such as powders, flours, dusts, bits and chunks. During the production process, mixing of the crystallization agent with the oily product also involves making any solid parts smaller (by, for example, bruising, comminuting, crushing, grinding, mashing, milling or macerating) to the point that the mixture has a paste-like consistency.

When using oily products, it may be necessary to perform pasteurization. Such pasteurization can be advantageously performed as part of the heating necessary for making the viscous oil-containing product of the present invention.

BRIEF DESCRIPTION OF THE FIGURES

The invention is herein described, by way of example only, with reference to the accompanying figures, wherein.

DETAILED DESCRIPTION OF THE INVENTION

Figure 1A:
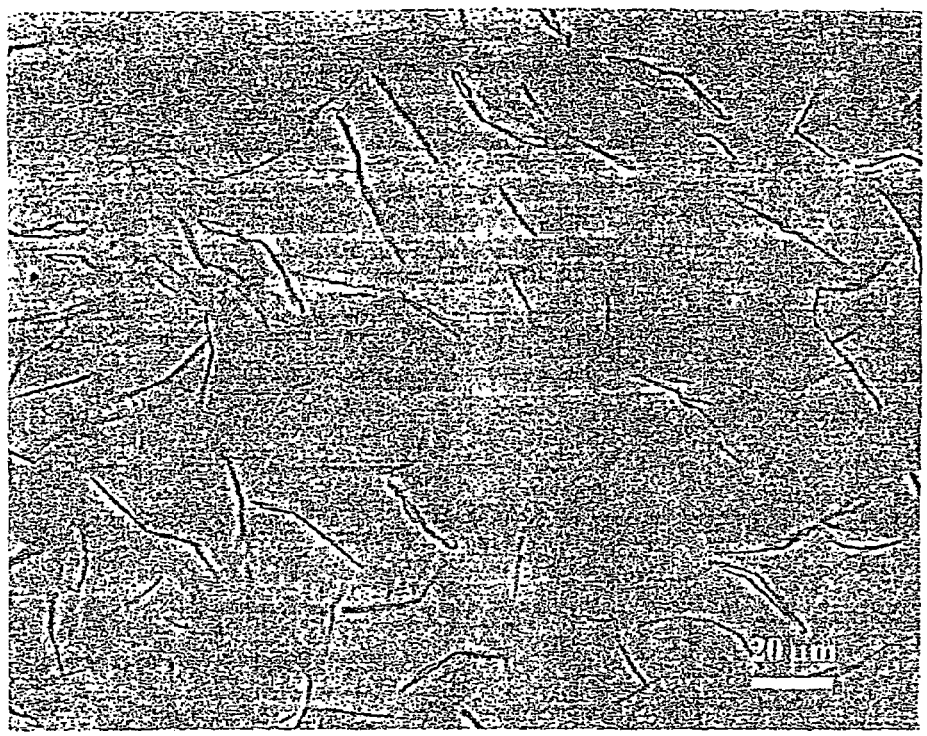
FIG. 1A is a reproduction of an image of a viscous oil product of the present invention at 25° C. using digital light microscopy (DLM) with differential interference (DI) taken using Nomarski Optics.

The present invention is of a viscous oil product and a method of making the same using only moderate heating thus reducing the production of unhealthy oil-related byproducts. The product and the method of the present invention may be better understood with reference to the accompanying description and figures. The viscous oil product contains no unhealthy additives and is virtually water-free, ensuring a long shelf life. The nearest prior art, U.S. Pat. No. 6,117,476 and U.S. Pat. No. 6,156,369 by the same inventor, teaches the use of monoglycerides to thicken oils and produce spreadable food products. The inventor has found that, unexpectedly and unpredictably, other compounds, not just monglycerides, also achieve the thickening of oils by forming lamellar liquid crystals. Thus the present invention teaches of a product including an oil and a crystallizing agent.

Crystallizing agents useful according to the present invention include monoglycerides, as described in U.S. Pat. No. 6,117,476 and U.S. Pat. No. 6,156,369 as well as additional crystallizing agents, divided into eight families, see hereinabove.

A first method of making a viscous oil product of the present invention involves mixing an oil, a crystallizing agent and additives to an elevated temperature, for example between about 45° C. and about 120° C., preferably between about 45° C. to about 90° C. and even more preferably between about 45° C. to about 75° C. It is clear to one skilled in the art that the order of heating and adding the oil, the crystallizing agent and additives is a technical detail and not salient to the present invention. Subsequent to heating and after confirmation that the mixture is homogenous, the mixture is allowed to cool leading to formation of lamellar liquid crystals, preferably in the final packaging.

In general when a low proportion of crystallizing agent is used (up to about 3% by weight of the oil, and depending on the oil and crystallizing agent) then, at room temperature, the viscous oil product of the invention is liquid but more viscous than the oil itself. When higher proportions of crystallizing agent are used the product is solid but smearable, like margarine, butter or paraffin wax.

The increased viscosity of oil treated according to the method of the present invention is a result of the unexpected and never before observed formation of a lamellar liquid crystal structure in oil, see Example 1. Thus, it must be made clear that practice of the present invention results in the hardening of oils and fats through crystallization to form lamellar liquid crystals. Such factors as crystal morphology, crystal size, habit, population by volume and population by number all influence the exact properties of the viscous oil product of the present invention.

It has been found that homogenization (for example by methods such as high-shear homogenization or piston homogenization) of a mixture of the present invention during cooling allows formation of crystals much smaller than those formed without such a homogenization step. All things being equal, the smaller the crystals in a viscous oil product of the present invention, the more esthetic and smearable the product is. Thus, a feature of the present invention is the addition of a homogenization step. After heating and mixing, the temperature of the mixture is allowed to cool during a homogenization step. Homogenization preferably occurs during the crystallization itself.

It has been found that the addition of a crystal-stabilizing agent to the mixture stabilizes the crystal structure of the final product. While not wishing to be held to any one theory, it is believed that the crystal-stabilizing agent wraps around the ends of the liquid crystal lamellae, preventing smaller crystals from joining to produce larger crystals. Thus, a further feature of the present invention is the addition of a crystal stabilizing agent, preferably powdered fat with a melting point less than about 80° C. Suitable crystal stabilizing agents include Akofine PO5®, Akofine R® and Cessa Powder 60® marketed by Karlshamns (Karlshamn, Sweden). The amount of crystal stabilizing agent is preferably between about 0.001% and about 5% of the weight of the oil, and more preferably between about 0.1% and about 2% of the weight of the oil.

When used, a crystal stabilizing agent is added to the mixture prior to crystal formation. When the temperature of the mixture is higher than the melting point of the crystal stabilizing agent, a clear oil/crystallizing agent/crystal stabilizing agent phase results. The mixture is allowed to cool to a temperature when crystallization begins so that the base oil/crystallizing agent/crystal stabilizing agent phase becomes cloudy. The mixture is then allowed to cool farther to produce a product of the present invention. When the mixture is homogenized as described hereinabove, homogenization is optimally performed during crystallization.

To a viscous oil product of the present invention, it is possible to add additional oil soluble products, specifically essential fatty acids (vide infra), vitamins or flavorings such as lemon oil or garlic oil.

Homogenous Oily Pastes

A popular oil product known in the art is an oily paste. Crushing a naturally occurring seed or other plant part and then heating the resulting flour makes the paste. In such a fashion, products such as sesame paste (tahini) are made. The tahini is then consumed as is or used as a component of a variety of edible products.

The problem with oily pastes such as tahini is that these are substantially non-homogenous products having an oil phase and a fiber phase made of relatively large fiber particles, proteins, carbohydrates and other oil-insoluble materials.

Prior art oily pastes can be made to be temporarily homogenous by vigorous mixing for use. Left to stand, for example during transport and storage, the phases separate. After long-term storage, the phases may irreversibly separate and the product consequently discarded.

In some cases, a paste cannot be made directly by crushing an oil-containing plant part. For example, when peanuts are ground, a paste is not formed but rather there is separation into peanut oil and a hard pulp cake. To make the popular edible product known as peanut butter it is necessary to add significant amounts of unhealthy partially hydrogenated fats to make a homogenous spread.

The production of stable oily pastes without the addition of unhealthy fats or oils is achieved by the method of the present invention. Although not wishing to be held to any one theory, it is believed that pulp and other oil-insoluble components are suspended within the lamellae of the liquid crystal structure of the present invention. Thus, a paste of the present invention is homogenous, even after extended storage. Depending on the ratio of oil to crystallizing agent a paste of the present invention may be a homogenous liquid, a viscous paste (like prior art peanut butter) or a solid margarine-like product.

According to a first embodiment of the homogenous oily paste of the present invention, to an oily paste (e.g., tahini) is added a crystallizing agent of the present invention. The mixture is heated, mixed and allowed to cool. A homogenization step to reduce crystal size, as described above, may be performed. A crystal stabilizing agent may be added as described above. It is clear that to ensure that the homogenous oily paste of the present invention is homogenous, sufficient mixing must be performed during the cooling process, ensuring that pulp particles are effectively trapped inside the crystal structure of the final product.

In a second embodiment of the homogenous oily paste of the present invention, to an oily product, especially an oily plant product (e.g. crushed roasted peanuts) is added a crystallizing agent of the present invention. The mixture is then ground to a paste at an elevated temperature, as described hereinabove. Once a homogenous paste is formed, the mixture is allowed to cool. A homogenization step to reduce crystal size, as described above, may be performed.

A crystal stabilizing agent may be added as described above. It is clear that to ensure that the homogenous oily paste of the present invention is homogenous, sufficient mixing must be performed during the cooling process, ensuring that pulp particles are effectively trapped inside the crystal structure of the final product.

The preferred oily products for use in making the homogenous oily paste of the present invention include tahini and sesame seeds (40%–60% oil by weight), peanuts (45%–55% oil by weight), almonds (45%–55% oil by weight), walnuts (50%–70% oil by weight), pine nuts (55%–65%) and macadamia nuts (70–85% oil by weight). Exceptionally preferred are walnuts which contain omega-3 fatty acids and macadamia nuts containing palmitoleic acid and having a low omega-6 fatty acid content.

The amount of crystallizing agent added when making a homogenous oily paste of the present invention is as described hereinabove. The exact amount of crystallizing agent added is dependent on the desired viscosity of the homogenous oily paste, the nature of the crystallizing agent and the nature of the oily product. As with other oil products of the present invention. the amount of crystallizing agent in a large part determines the exact properties of the product. Lower proportions of crystallizing agents leave homogenous oily paste of the present invention in the form of a homogenous but viscous liquid appropriate for pouring, for example as a sauce or for cooking. Higher proportions of crystallizing agent produce a solid but smearable homogenous oily paste of the present invention, much like margarine.

To the homogenous oily paste of the present invention it is possible to add additional oil soluble products, specifically essential fatty acids (vide infra), vitamins or flavorings such as lemon oil or garlic oil.

EFA Containing Oil Products

A number of fatty acids, termed essential fatty acids (EFAs) are beneficial for human health when consumed.

Two exceptionally beneficial EFAs are docosahexaenoic acid (DHA) and eicosapentaenoic acid (EPA). DHA and EPA are found in the oil of certain cold water fish (e.g. anchovy, herring, mackerel, menhaden, sardine, and salmon) and can theoretically be consumed directly. However, fish oil is generally considered as having an offensive flavor and smell. Fish flesh can be consumed as a source of DHA and EPA, but is generally difficult to use as a general source of nutrient. Fish is notoriously difficult to transport and store, many fish species are endangered and may become expensive, and not everyone likes to eat sushi or Hollandse Nieuw. Cooking fish before consumption damages EFAs therein.

Another essential fatty acid considered beneficial is alpha linolenic acid (ALA) found in not normally eaten crops such as flax, camelina and safflower. ALA is healthy and is also a precursor to DHA and EPA. Therefore it is an ideal product for people who chose not to consume animal-based (including fish-based) products for various reasons. It is advisable for such people to eat extra amounts of ALA and derivatives as alternatives to the consumption of DHA/EPA. There are few tasty products that supply ALA.

Another essential fatty acid considered beneficial is gamma linolenic acid acid (GLA) found in not normally eaten crops such as borage seed or in primrose oil or linolenic acid (LA) which is converted into gamma-linolenic acid (GLA) in the body. There exists evidence that consumption of conjugated linolenic acids (CLA) especially double unsaturated conjugated linolenic acids, and most preferably 8-cis, 10-trans linolenic acid can help prevent or even cure cancer.

Clearly there is interest in promoting the consumption of the above-mentioned and other EFAs. Obviously it is preferable that EFAs and derivative be consumed as "normal foods" and not as dietary supplements or other forms that require a change in consumer behavior. To gain acceptance, such a "normal food" must be tasty, easy to use, normally eaten and not require a change in lifestyle. However, this is made difficult by the fact that EFAs decompose at elevated temperatures and are susceptible to decomposition in the presence of both water and air. To maintain the beneficial properties of EFAs it is necessary to prevent contact with water and oxygen. Further, fatty acids must not be heated to a temperature where decomposition and concomitant loss in beneficial properties occurs.

Liquid oils are an unsuitable medium for the delivery of EFAs. Liquid oil is not routinely imbibed, and is often used for cooking, especially frying. Routine decanting of oil from a bottle exposes the oil to air. In the most favorable use, where liquid oil is used as a salad oil, much oil does not adhere to the salad component and the oil is wasted. It is also important to note that most salad oils are refined at elevated temperatures, rendering them relatively unhealthy.

In any case, many people in the world prefer to use hardened or solidified fats as opposed to oil when cooking baking or frying. This can be a result of culture, texture, tradition or simply the ease of measuring a required amount. Thus despite the fact that liquid oil may be healthier for frying (olive oil, for example, is considered relatively healthy for frying), many people continue to use less healthy solid fats or solidified oils.

In the Western world fat is preferably consumed in the form of a spread on a carbohydrate substrate such as potatoes, bread or crackers.

Typically lard, fowl fats or butter contain between 15% and 20% water that beyond causing EFA decomposition also leads to rancidity, shortening product shelf-life. Further, the higher-animal origin of lard, fowl fats or butter is suspected as being unhealthy.

Margarine and margarine-like products are also an unsuitable medium for the delivery of EFAs. Margarine and margarine type products typically contain hydrogenated and partially hydrogenated oils (suspected carcinogens) as well as trans isomer fatty acids (suspected as contributing to athersclerosis formation). The use of healthy oils (such as olive oil) in margarine-type products is not a successful strategy. The necessity for emulsifier (often higher than 35%) dilutes the health benefits which may be gained from the use of a healthy oil. The margarine manufacture process (including heating and partial hydrogenation) inherently reduces the healthiness of a margarine product. Margarines typically include roughly 35% water that beyond causing EFA decomposition also leads to rancidity. shortening product shelf-life.

Thus, it is desirable to produce a solid EFA-containing food product that contains no water and does not have the tendency to absorb water, is sealed to the penetration of oxygen and for which the production process requires only moderate heating. Further, it is advantageous that non-EFA components of the food product be healthy or at least not harmful.

All these aims can be achieved by adding EFAs or EFA-rich oils to a product of the present invention. Amongst all other obvious advantages, it is clear that as the product is virtually water and preservative free, EFAs in the product remain effective over a long period of time.

The manner in which EFAs are added to any one of the products of the present invention is clear. An EFA or EFA containing oil can be added at any moment to the mixture, ensuring that the EFA is never exposed to damagingly high temperatures.

Since the motivation for the addition of an EFA to a viscous oil product of the present invention is to make a food with positive health benefits, it is clear that it is most advantageous to use the EFA together with a healthy oil. Thus, the oil used is preferably olive oil, walnut, macadamia or avocado oil. The most preferred crystallizing agent is lechitin, also having positive health benefits. Akofine PO5® is a preferred crystal stabilizing agent, as Akofine PO5® is not hydrogenated.

When an EFA-containing oil has an acceptable flavor, the EFA-containing oil may be used directly as an oil in the method of the present invention to make a spread. For example EFA-containing borage seed oil can be used as oil for making a surprisingly tasty GLA-containing "borage seed margarine".

Preferred EFAs include: DHA and EPA from any source, most preferably as components of fish oil; ALA from any source, preferably of non-animal origin, most preferably as a component of flax, camelina or safflower oil; GLA from any source, most preferably as a component of borage seed or primrose oil; CLA, pure or as mixtures, especially 8-cis, 10-trans linolenic acid from any source. It is clear that it may be advantageous to combine one or more EFAs in a single tasty viscous oil product of the present invention.

When making an EFA-containing product of the present invention, it is preferable the oil or the mixture of the oil with other components be de-aerated. It is also preferable that mixing, cooling and homogenization steps be performed under a substantially inert (that is dry and oxygen-less) atmosphere.

As in other embodiments of the present invention, oils-soluble flavorings, with which one skilled in the art is well acquainted, are added. In the opinion of the inventor, for fish oil preferred flavors are garlic, basil, oregano or smoky. For ALA and GLA, preferred flavors are garlic, basil, and oregano.

SPECIFIC SYNTHETIC EXAMPLES

First General Method of Solidified Oil Production

Example 1

To 99.5 gram extra virgin olive oil was added 0.5 gram of stearic acid monoglyceride and heated to 80° C. with stirring. The mixture was allowed to cool to room temperature, making a viscous oil product of the present invention.

Figure 1B:
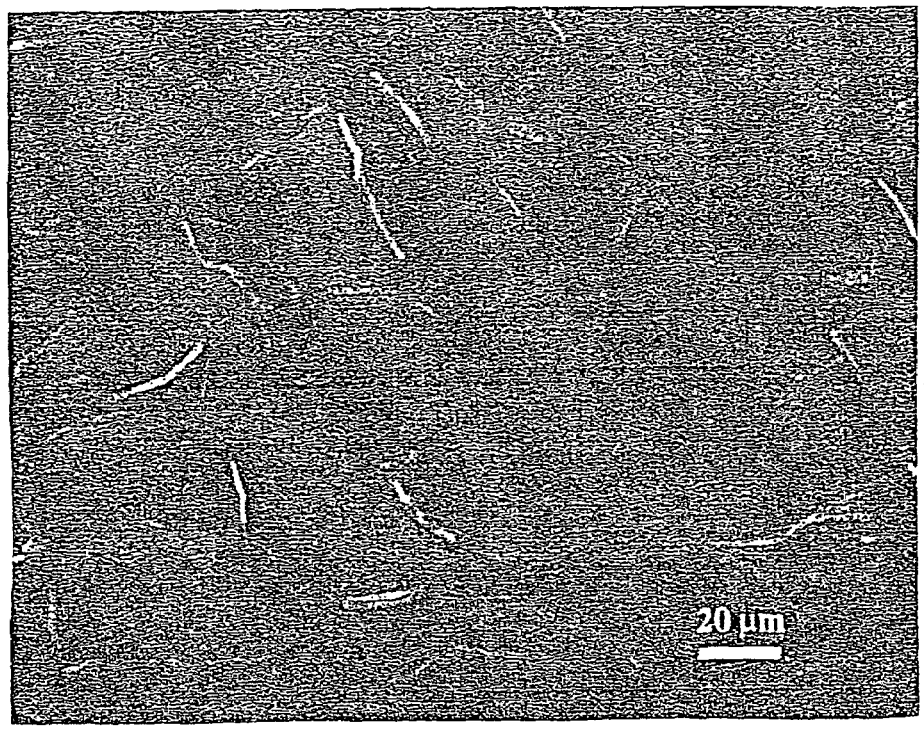
FIG. 1B is a reproduction of an image of a viscous oil product of the present invention at 25° C. using digital light microscopy (DLM) with differential interference (DI) and a crossed polar image.

Digital light microscopy (DLM) with differential interference (DIC) and crossed-polar optics was used to observe structural changes at the micrometer scale as a function of temperature. Lamellar liquid crystal were observed to be present at a temperature of below 60° C., to disappear at a temperature above 60° C. and to re-form when the temperature was again lowered to below 60° C. In FIG. 1 is a reproduction of a DIC image of the viscous oil product at 25° C. taken using Nomarski Optics (FIG. 1A) and crossed polar image (FIG. 1B).

Figure 2:
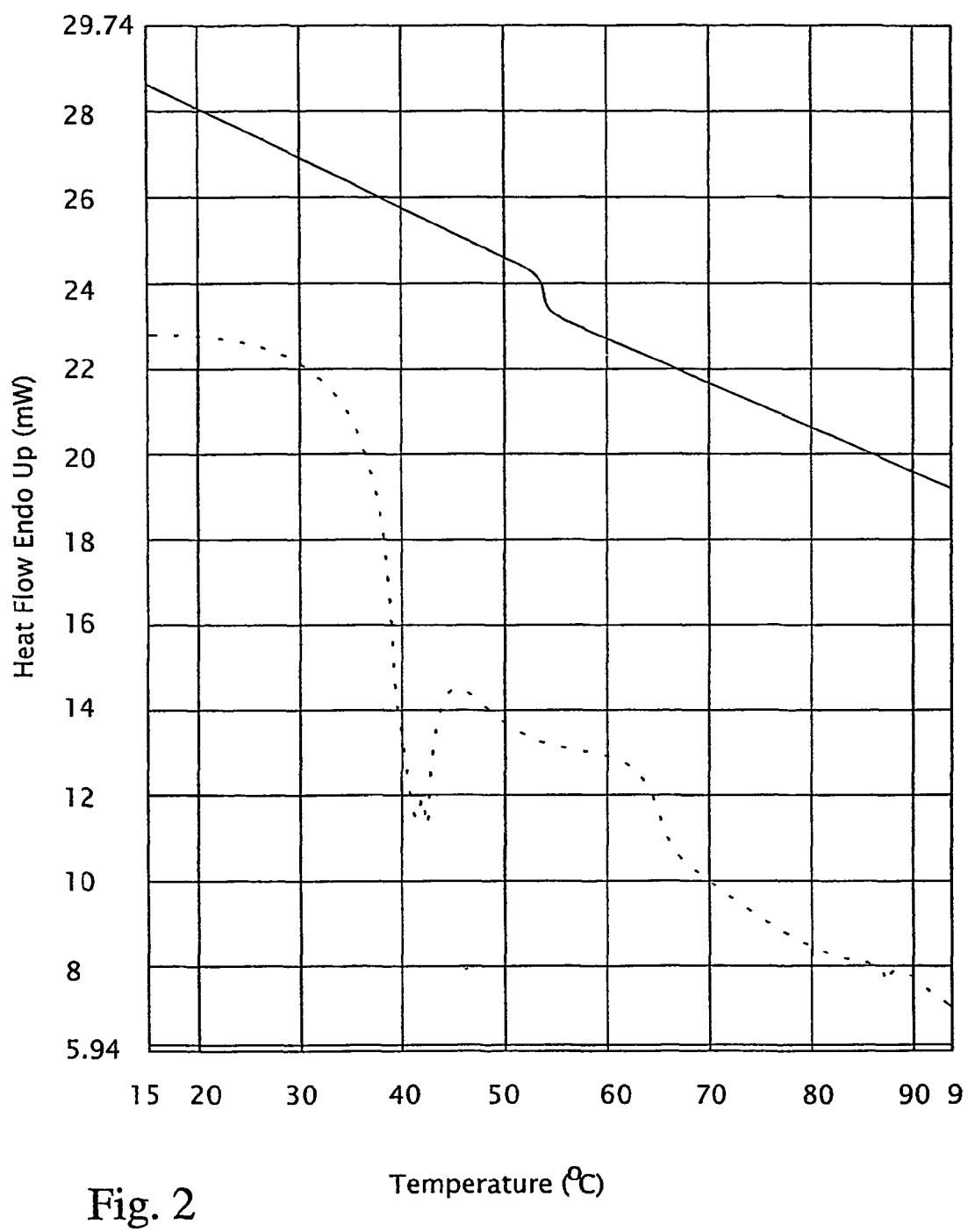
FIG. 2 is a result of differential scanning calorimetry measurement of a viscous oil product of the present invention indicating both liquid and solid properties.

The Theological properties of a viscous oil product of the present invention (7% stearic monoglyceride in olive oil) were measured, including viscosity as a function of temperature and shear rates, indicating both liquid and solid properties. A clear increase in viscosity was observed. Differential scanning calorimetry (DSC) confirms the phase transformation, see FIG. 2.

Figure 3A:
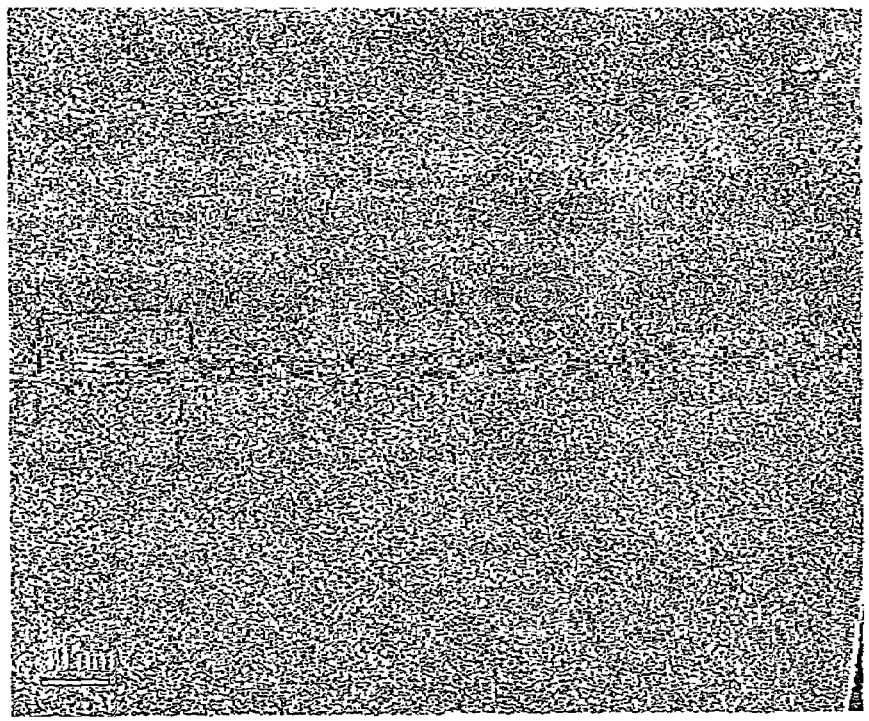
FIG. 3A is a reproduction of cryogenic temperature transmission electron microscope (cryo-TEM) image of a viscous oil product of the present invention composed of 0.5% stearic monoglyceride in olive oil.
Figure 3B:
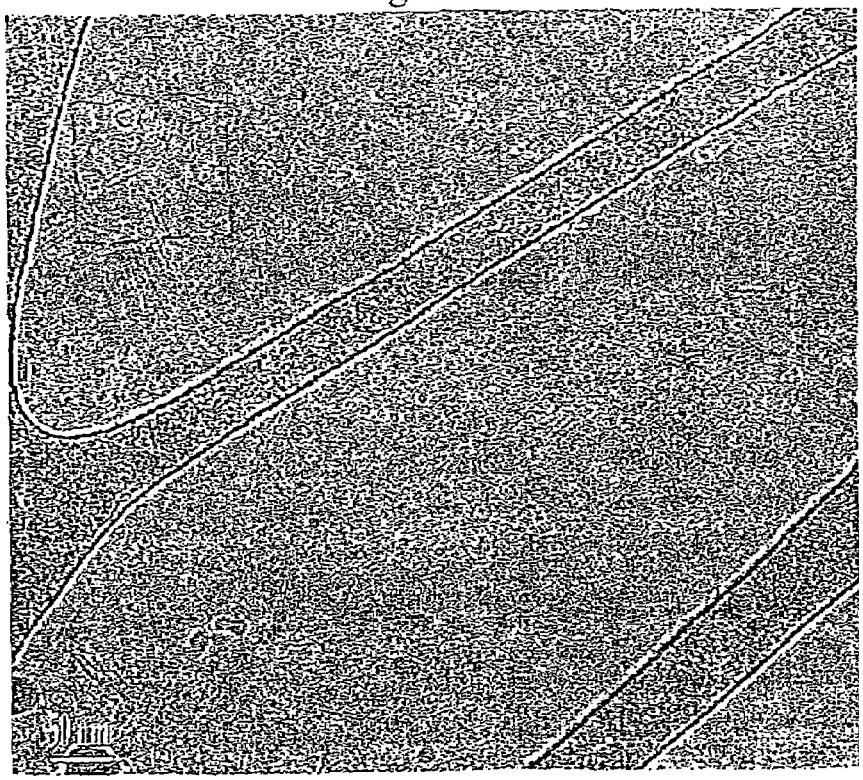
FIG. 3B is a reproduction of cryogenic temperature transmission electron microscope (cryo-TEM) image of a viscous oil product of the present invention composed of 7% stearic monoglyceride in olive oil.

A thin-liquid film of the viscous oil product of the present invention was spread on a transmission electron microscope grid at 58° C. in a controlled-environment vitrification system, cooled by immersion in liquid nitrogen and studied using a cryogenic temperature transmission electron microscope (cryo-TEM). In FIG. 3 are cryo-TEM images of viscous oil products of the present invention. In FIG. 3A is a reproduction of a cryo-TEM image of a first viscous oil product of the present invention (0.5% stearic monoglyceride in olive oil). In FIG. 3B is a reproduction of a cryo-TEM image of a second viscous oil product of the present invention (7% stearic monoglyceride in olive oil). In FIG. 3, small parallel lines (for example, inside the dashed square) are lamellar liquid crystals.

Figure 4:
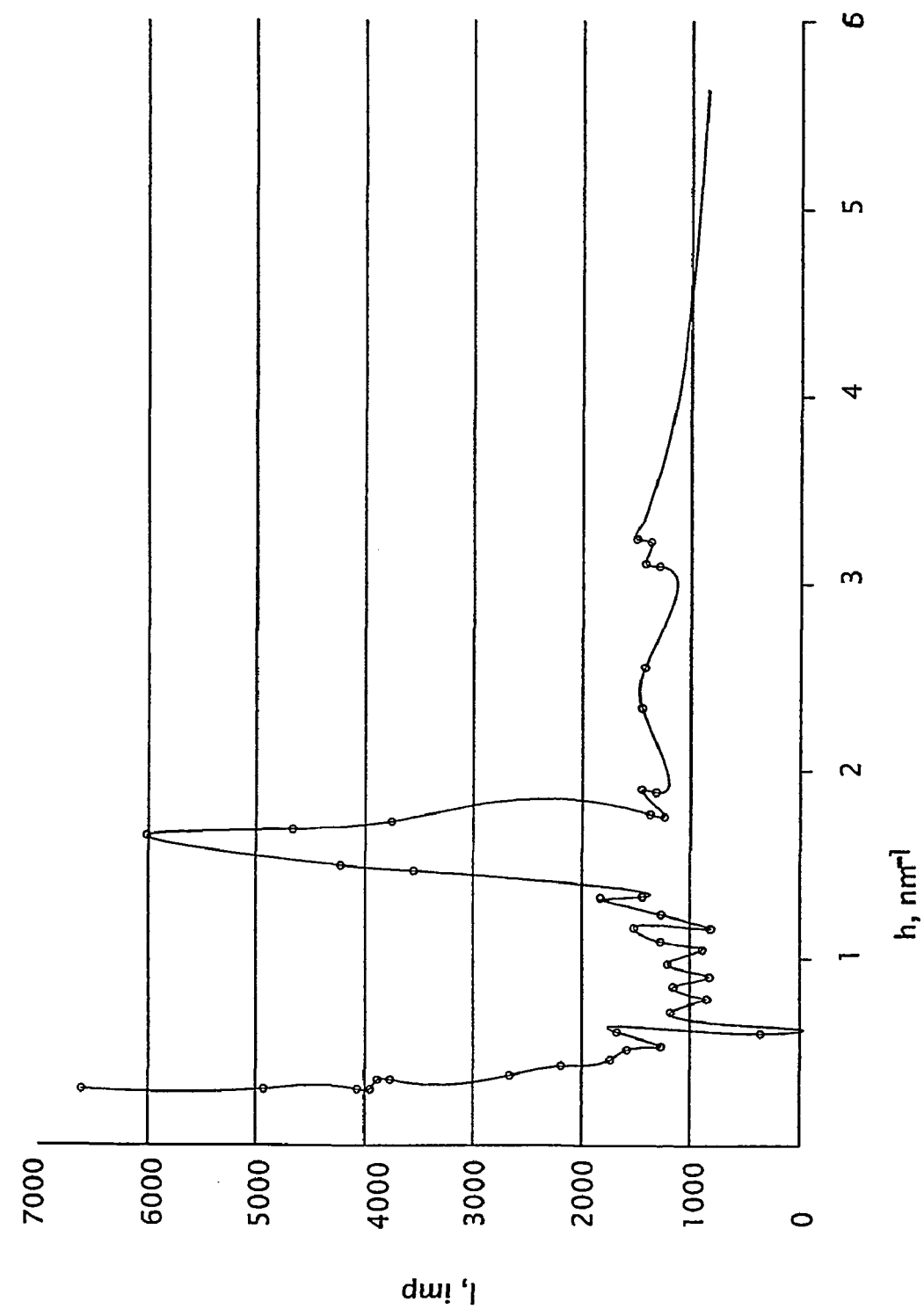
FIG. 4 is the result of a small-angle X-ray scattering (SAXS) measurement of a viscous oil product of the present invention.

In FIG. 4 is shown the result of a small-angle X-ray scattering (SAXS) of a viscous oil product of the present invention (7% stearic monoglyceride in olive oil). The sharp peak centered at 1.35 $nm^{-1}$ (spacing of 4.6 nm) and the broad peak centered at 2.70 $nm^{-1}$ (exactly one-half of the spacing of the sharp peak) is characteristic of a lamellar phase made of small domains. The measured spacing of 4.6 nm is in excellent agreement with the cryo-TEM results.

Example 2

Crystallizing agent (monoglyceride derivative of palmitic acid, 4 g) was mixed with extra virgin olive oil (96 g), heated to 68°–70° C. and subsequently cooled to room temperature to produce a viscous oil product of the present invention.

Example 3

Crystallizing agent (monoglyceride derivative of palmitic acid, 5 g) was mixed with extra virgin olive oil (95 g), heated to 68°–70° C. and subsequently cooled to room temperature to produce a viscous oil product of the present invention.

Example 4

Crystallizing agent (monoglyceride derivative of palmitic acid, 6 g) was mixed with extra virgin olive oil (94 g), heated to 68°–70° C. and subsequently cooled to room temperature to produce a viscous oil product of the present invention.

Example 5

Crystallizing agent (monoglyceride derivative of palmitic acid, 4 g) was mixed with distilled avocado oil (96 g), heated to 68°–70° C. and subsequently cooled to room temperature to produce a viscous oil product of the present invention.

Example 6

Crystallizing agent (monoglyceride derivative of palmitic acid, 5 g) was mixed with distilled avocado oil (95 g), heated to 68°–70° C. and subsequently cooled to room temperature to produce a viscous oil product of the present invention.

Example 7

Crystallizing agent (monoglyceride derivative of palmitic acid, 6 g) was mixed with distilled avocado oil (94 g), heated to 68°–70° C. and subsequently cooled to room temperature to produce a viscous oil product of the present invention.

Example 8

Crystallizing agent (polyglycerol poly ricinoleate, 10 g) is mixed with extra virgin olive oil (100 g), heated to 75° C. and subsequently cooled to room temperature to produce a viscous oil product of the present invention.

Example 9

Crystallizing agent (oleic acid monoglyceride, 10 g) is mixed with soy oil (110 g) and Cessa Powder 60® (3 g), heated to 65° C. and subsequently cooled to room temperature to produce a viscous oil product of the present invention.

Example 10

Crystallizing agent (monoglyceride derivative of oleic acid, 10 g) is mixed with soy oil (110 g) and Cessa Powder 60® (5 g) and heated to 65° C. After a clear mixture is achieved, the mixture is allowed to cool to 58° C. when the mixture begins to appear cloudy. The mixture is then homogenized by shear-homogenization in a mixer at 8000 rpm and allowed to cool to a temperature of 50° C. room temperature to produce a viscous oil product of the present invention.

Example 11

Crystallizing agent (lechitin, 6 g) is mixed with fish oil (5 g), extra virgin olive oil (88 g) and Akofine PO5® (1 g), heated to 70° C. and subsequently allowed to cool to room temperature to produce a viscous oil product of the present invention.

Example 12

A mixture of corn oil (60 g) and borage seed oil (40 g) is de-aerated using nitrogen. Crystallizing agent (propylene glycol mono stearate, 6 g), Akofine PO5® (2 g) and lemon essence (0.1 g) are added. The mixture is heated to 70° C. and subsequently allowed to cool to room temperature to produce a viscous oil product of the present invention.

Example 13

To pasteurized tahini (100 g, containing 50% oil) is added crystallizing agent (sucrose mono stearate, 1.5 g) and thoroughly mixed The mixture is heated to 70° C. and subsequently allowed to cool to room temperature to produce a homogenous oily paste of the present invention.

Example 14

Sesame seed are washed, peeled, dried and pulverized in a mill to get sesame flour. Sesame flour (100 g, containing 50% oil) is heated to 90° C. to allow pasteurization. After 60 minutes, crystallizing agent (sucrose mono stearate, 1.2 g) is added and the resulting paste thoroughly mixed while being allowed to cool to room temperature to produce a homogenous oily paste of the present invention.

Example 15

Crushed peanuts (100 g, containing 50% oil) are mixed with crystallizing agent (2 g triglycerol mono stearate). The mixture is heated to 70° C. and ground until a homogenous paste is attained. The homogenous paste of the present invention is allowed to cool to room temperature.

Example 16

To shelled macadamia nuts (100 g, containing 80% oil) are added 3 g palmitic acid monoglyceride and 0.1 g Cessa Powder 60®. The mixture is heated to 70° C. and ground until a homogenous paste is attained. The paste is allowed to cool to 60° C. The mixture is homogenized by shear-homogenization in a mixer at 8000 rpm and thereafter allowed to cool to room temperature producing a homogenous oily paste of the present invention.

It will be appreciated that the above examples and descriptions are intended only to serve as examples, and that many other embodiments are possible within the spirit and the scope of the present invention. In particular, although the primary focus of the writing hereinabove is for edible food spreads, it is understood that the viscous oils of the present invention may find application in many and varied fields of human endeavor.

The invention claimed is:

1. A method of making a viscous oil-containing product, comprising the steps of:
   (a) providing at least one oil and at least one non-monoglyceride crystallizing agent capable of forming liquid crystals in oils;
   (b) dissolving said crystallizing agent, at an elevated temperature, in said at least one oil, to produce a mixture containing at least about 15% of said oil, by weight, and
   (c) cooling said mixture so as to form said liquid crystals, thereby increasing a viscosity of said mixture.

2. The method of claim 1, further comprising, prior to step (c):
   (d) introducing a crystal stabilizing agent so as to stabilize said mixture.

3. The method of claim 2, wherein said crystal stabilizing agent is added in an amount between about 0.001% and about 5% of a weight of said oil.

4. The method of claim 1, said mixture containing at least about 90% of said oil, by weight.

5. The method of claim 1, said mixture containing from about 30% to about 90% of said oil, by weight.

6. The method of claim 1, wherein said at least one non-monoglyceride crystallizing agent includes a crystallizing agent selected from the groups of crystallizing agents consisting of phospholipids, glycerol esters of fatty acids, polyglycerol esters of fatty acids, propylene glycoesters, sugar esters of fatty acids, stearoyl lactylates, and polyglycerol poly ricinoleate.

7. The method of claim 1, wherein said at least one non-monoglyceride crystallizing agent includes a monodiglyceride.

8. A method of making a viscous oil-containing product, comprising the steps of:
   (a) providing at least one oil and at least one non-monoglyceride crystallizing agent;
   (b) dissolving said crystallizing agent, at an elevated temperature, in said at least one oil, to produce a mixture containing at least about 15% of said oil, by weight;
   (c) cooling said mixture so as to form crystals, and
   (d) performing a size reduction of said crystals in said mixture, so as to increase a viscosity of said mixture.

9. The method of claim 8, wherein said size reduction is performed during said cooling of said mixture.

10. The method of claim 8, further comprising the step of:
    (e) introducing a crystal stabilizing agent so as to stabilize said crystals in said mixture.

11. The method of claim 8, wherein said crystals include liquid crystals.

12. The method of claim 8, wherein said crystals include lamellar liquid crystals.

13. The method of claim. 8, wherein said size reduction is performed by a homogenization process.

14. The method of claim 11, wherein said at least one non-monoglyceride crystallizing agent includes a crystallizing agent selected from the groups of crystallizing agents consisting of phospholipids, glycerol esters of fatty acids, polyglycerol esters of fatty acids, propylene glycoesters, sugar esters of fatty acids, stearoyl lactylates, and polyglycerol poly ricinoleate.

15. The method of claim 11, wherein said at least one non-monoglyceride crystallizing agent includes a monodiglyceride.

16. A method of making a viscous oil-containing product, comprising the steps of:
    (a) providing at least one oil and at least one non-monoglyceride crystallizing agent;
    (b) dissolving said crystallizing agent, at an elevated temperature, in said at least one oil, to produce a mixture containing at least about 15% of said oil, by weight;
    (c) cooling said mixture so as to form crystals, and
    (d) introducing a crystal stabilizing agent so as to stabilize said crystals in said mixture.

17. The method of claim 16, wherein said crystals include liquid crystals.

18. A method of making a viscous oil-containing product, comprising the steps of:
    (a) providing at least one oil and at least one monoglyceride crystallizing agent;
    (b) dissolving said crystallizing agent, at an elevated temperature, in said at least one oil;
    (c) cooling said mixture so as to form crystals, and
    (d) performing a size reduction of said crystals in said mixture, so as to increase a viscosity of said mixture.

19. The method of claim 18, wherein said size reduction is performed during said cooling of said mixture.

20. The method of claim 18, said mixture containing at least about 90% of said oil, by weight.

21. The method of claim 18, wherein said crystals include liquid crystals.

22. The method of claim 18, wherein said crystals include larmellar liquid crystals.

23. A method of making a viscous oil-containing product, comprising the steps of:
    (a) providing at least one oil and at least one monoglyceride crystallizing agent;
    (b) dissolving said crystallizing agent, at an elevated temperature, in said at least one oil;
    (c) cooling said mixture so as to form crystals, and
    (d) introducing a crystal stabilizing agent so as to stabilize said crystals in said mixture.

24. The method of claim 23, wherein said crystals include liquid crystals.

25. A viscous oil-containing product comprising:
(a) at least about 15% of oil, by weight, and
(b) at least one non-monoglyceride crystallizing agent, wherein a plurality of liquid crystals are dispersed within the product so as to improve a viscosity of the product.

26. The viscous oil-containing product of claim 25, wherein a ratio of said oil to said crystallizing agent is between about 9:1 and about 49:1.

27. The viscous oil-c product of claim 25, wherein said crystals include lamellar liquid crystals.

* * * * *